United States Patent Office 3,433,753
Patented Mar. 18, 1969

3,433,753
PAINT COMPOSITION INCLUDING A DISPERSANT HAVING A SOLVATABLE CHAIN-LIKE COMPONENT
Ferenc Karoly Farkas, Maidenhead, and Derek John Walbridge, Slough, England, and John Rodney Foot, Arbroath, Scotland, assignors to Imperial Chemical Industries Limited, London, England, a corporation of Great Britain
No Drawing. Filed July 27, 1964, Ser. No. 385,497
Claims priority, application Great Britain, Aug. 1, 1963, 30,581/63
U.S. Cl. 260—22   8 Claims
Int. Cl. B01f 17/52; C08f 27/12; C08g 45/00

This invention relates to dispersants for use in dispersions of liquid or solid particles in an organic medium and to despersions in organic medium containing such dispersants.

According to this invention we provide a dispersant for use in dispersions in organic media, the dispersant having the formula:

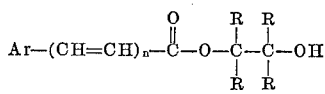

in which Ar is an aromatic group, $n$ is 1 or 0, from 2 to 3 R groups are H, $CH_3$ or $C_2H_5$ and the remaining R groups individually or the remaining group R—C—C—R in combination provides a solvatable chain-like component of at least 12 links. Preferably the solvatable chain-like component is of at least 18 links.

By "chain-like component of at least 12 links" is meant a component which comprises at least 12 atoms linked in series to form a chain-like or linear structure. The atoms so linked will usually be carbon, but these may be interspersed with other atoms such as oxygen.

The term "solvatable" as applied in this specification to the chain-like component of at least 12 links implies that the component is soluble in the organic medium where the medium is a liquid and compatible with the medium where the medium is polymeric solid. Generally, in order to achieve this objective the polarities of the organic medium and the component of the dispersant solvated thereby must be similar. For example, for use in an organic medium which is a non-polar liquid the dispersant component to be solvated generally must also be non-polar; for use in a polar medium the dispersant component generally must also be polar. In general, the polarity of the component will depend on the nature of the other atoms or groups attached to the basic chain structure.

The shorter chain-like components are represented, for example, by simple aliphatic hydrocarbon chains such as occur in long chain fatty acids, e.g. lauric, myristic and palmitic acids. Chains of at least 18 links, such as occur in stearic and behenic acids are preferred. The chains in such acids are non-polar and so are solvated by non-polar organic liquids such as aliphatic hydrocarbons. Longer chains of this type are found in dimers, trimers, and higher polymers of a hydroxyl-containing long chain fatty acids such as 12-OH stearic acid. Alternative chains would be provided by:

epoxidized natural oils;
low molecular weight epoxy resins derived from epichlorhydrin and a dihydric phenol such as diphenylolpropane or a condensed phenol;
gums, such as rosin, copal, damar and kauri and their esters with, say, glycerol and polymeric products thereof.

At chain lengths above 30 or so it becomes more convenient to characterise the chain-like component in terms of molecular weight. Suitable components of molecular weight in the range 500 to 1000 are:

polyester chains such as alkyd resins;
polymers of alkylene oxides such as ethylene, propylene, butylene and hexylene oxides;
higher molecular weight epoxy resins;
polyamide resins such as those derived from dimerized fatty acids;
polymerized drying oils;
phenol-formaldehyde, urea-formaldehyde and melamine-formaldehyde resins;
polyurethanes.

Chain-like components as represented by compounds of molecular weight in the range from 5,000 to $10^6$ are provided by addition polymers. The polarity and therefore the solvatability of this type of component may be varied by selection of appropriate monomers from which to form the addition polymer. Where the organic medium is non-polar, e.g. a liquid aliphatic hydrocarbon, the following are examples of suitable dispersant chains which can be dissolved:

polymers of long chain esters of acrylic, methacrylic or ethacrylic acid, e.g. stearyl, lauryl, octyl, 2-ethyl hexyl and hexyl esters of acrylic or methacrylic acid;
polymeric vinyl esters of long chain acids, e.g. vinyl stearate, vinyl laurate and vinyl octoate;
polymeric vinyl alkyl ethers; and
polymers of unsaturated hydrocarbons, such as ethylene, propylene, isobutylene and isoprene.

Where the organic medium is a liquid which is mainly aromatic hydrocarbon in nature, similar dispersant chains may be used and, in addition, shorter chain analogues, e.g. polymers of ethoxyethyl methacrylate, methyl methacrylate and ethyl acrylate. Also:

polymers of styrene and substituted styrenes, such as vinyl toluene and α-methyl styrene;
polymers of alkylene oxides, such as ethylene, propylene, butylene and hexylene oxides;
polymers of vinyl alkyl ethers, such as vinyl methyl ether and vinyl ethyl ether; and
lower polymers of vinyl halides and vinyl esters, such as vinyl chloride and vinyl acetate, can be dissolved in such an organic liquid.

Where the organic medium is a liquid which is highly polar in nature, e.g. ketones, esters and alcohols, suitable dispersant chains which can be dissolved in the liquid include:

polymers of styrenes, alkylene oxides, vinyl alkyl ethers, vinyl halides and vinyl esters as mentioned above;
polymers of acrylic and methacrylic acid and amides thereof;
polyethylene and polypropylene glycols;
hydroxylated polymers, e.g. polyvinyl alcohol; and
polymers of glycol mono-methacrylates and acrylates.

Naturally-occurring polymeric chains such as those of rubber and cellulose may also be used, if necessary, modified to make them solvatable by the selected organic liquid of the dispersion. Solvatable polymeric chains obtained by condensation of dicarboxylic acids and aliphatic diols or diamines are also suitable.

The term "polymers" as used above includes copolymers and these may be random or graft copolymers.

These examples listed above are merely illustrative of the principle to be followed in selecting a chain-like component which will be solvated by the particular organic liquid in which the dispersant is used, i.e. the principle that the dispersant chain, to be solvated, must be of similar polarity to that of the organic liquid.

Similar considerations apply in the case of solid polymeric organic media, though here the choice is more limited and generally it is preferred to use a polymeric dispersant component the polymer chains of which are similar or closely related in composition to those of the medium. There are exceptions to this generality; for example, polymethyl methacrylate and polyvinyl chloride are compatible over a wide range of proportions, so a dispersant suitable for use in a polyvinyl chloride medium may contain polymethyl methacrylate chains, and vice versa.

Polymeric organic solids usually are of high molecular weight, e.g. more than 100,000, and in many cases the solvated chain-like component of the dispersant used therein needs to be of a comparable molecular weight in order to avoid degradation of the properties of the solid. In the case of dispersions in organic liquids the solvated chain-like component is usually of molecular weight less than 100,000. Higher molecular weights are not preferred, chiefly because of the much higher weight proportion of the dispersant which would be required.

The ester link in the above formula is of the type produced for example by reacting a carboxyl group with an epoxy group in that the opening of the epoxy ring results not only in an ester link to one carbon atom but also the production of a hydroxyl group on an adjacent carbon atom. A similar structure may also be produced for example by esterifying a carboxyl group with one hydroxyl of an $\alpha,\beta$-glycol group.

Another essential feature of the dispersant is that it contains linked to the solvatable component through the ester link, an aromatic group. The aromatic group may be a simple group such as phenyl, or a condensed polynuclear group such as naphthyl or a heterocyclic group derived from such compounds as pyridine, quinoline and pyrrole. The aromatic group may itself be linked to the ester group by an ethylenic link C=C. Preferably the aromatic group contains one or more substituent polar groups. Typical polar groups and their approximate dipole moments are:

| Dipole moment ($10^{-18}$ e.s.u.) | |
|---|---|
| 4.5 | $-NR_3^+$, $-SO_3''$, $-COO'$ betaines $-R_3N^+CH_2CO_2'$ |
| 4.0 | $-CN$, $-NC$, $-RN=C=O$, $-RN=C=S$, $-NO_2$ |
| 3.0 | $-COCl$, $-NO$ |
| | sulphones $\begin{array}{c}R\\ \diagdown\\ SO_2\\ \diagup\\ R\end{array}$, sulphoxides $\begin{array}{c}R\\ \diagdown\\ S{\rightarrow}O\\ \diagup\\ R\end{array}$ |
| | nitrites, nitrates, amine oxides $-R_3N{\rightarrow}O$ |
| 2.8 | Ketones $-\underset{\underset{O}{\|}}{C}-R$, $-\underset{\underset{O}{\|}}{C}-H$ |
| | oximes $-C=NOH$ |
| 2.5 | $-SO_2NH_2$, $-CF_3$, $-CCl_3$, $-CHCl_2$, $-CH_2Cl$ |
| 2.0 | $-SO_3H$, $-COOH$, $-COOR$ |
| 1.5 | $-OH$, halogen, $-NHCOR$ |
| 1.3 | $-OR$, $-SR$ |
| 1.0 | $-NH_2$, $-NHR$, $-NR_2$ |

R signifies an alkyl or aryl group.

This list gives numerical values without reference to direction.

A particularly useful group is the nitro group attached to the aromatic ring.

In the above formula the hydroxyl group adjacent to the ester linkage is obtained when the ester linkage is formed by reacting an aromatic carboxylic acid with one hydroxyl of an $\alpha,\beta$-glycol, or the epoxy equivalent, attached to or subsequently attached to the chain-like component.

For example, suitable aromatic acids include benzoic, naphthoic, nicotinic, picolinic, quinaldinic and derivatives containing substituent polar groups such as those listed above.

The $\alpha,\beta$-glycol or epoxy structure to be esterified may already be attached to the chain-like component at the time of esterification. Epoxy groups are particularly convenient to esterify and these may be introduced into the chain-like component, for example, by reacting epichlorhydrin with compounds containing hydroxyl, carboxyl, phenol or amine groups or salts thereof, oxidation of an ethylenic linkage or removal of HCl from an $\alpha,\beta$-chlorhydrin.

Where the chain-like component is an addition polymer, the epoxy group may be introduced by copolymerizing an epoxy-bearing monomer with another monomer or monomers to form the polymer. Suitable epoxy-bearing monomers are glycidyl acrylate, glycidyl methacrylate and allyl glycidyl ether.

Another method of providing the adjacent hydroxyl group is to react a carboxyl group attached to the chain-like component with an ester of the aromatic acid containing an epoxy group adjacent the ester linkage, e.g. a glycidyl ester of the aromatic acid.

It will be appreciated from the above descriptions that the solvated chain or chains may comprise one or more chains which may each properly be regarded as pendant from one or both of the adjacent saturated carbon atoms in the above formula. For example, the aromatic carboxylic acid may be reacted with 1,2-dihydroxy- or 1,2-epoxy-octadecane.

In another embodiment the two said carbon atoms may form an integral part of the solvatable chain in that they are derived from an intermediate or terminal portion of a solvatable chain. For example, where the solvatable chain is derived from an epoxidized oil by reacting an epoxy group located on an intermediate portion of the oil molecule with an aromatic acid, then the two said carbon atoms form an integral part of the solvatable chain, being derived from it. Similarly, when an epoxy resin having a terminal epoxy group is reacted, the two said carbon atoms will be derived from a terminal part of the solvatable epoxy resin chain.

In yet another embodiment, the solvatable chain may be linked to one of the said carbon atoms through, say, an ester link. For example, this structure is obtained when, say, an aromatic acid is esterified with an epoxy group on an addition copolymer in which the epoxy groups have been provided by copolymerization with a glycidyl ester of an unsaturated acid. In this case the solvatable chain is provided by the addition polymer which is linked to one of the said carbon atoms through the ester link in the glycidyl co-monomer. In an alternative form of this other embodiment, the solvatable chain may be part of a block or graft copolymer.

The dispersants of this invention may contain more than one aromatic group per molecule. Where more than one aromatic group is attached to the same solvatable chain-like component then the solvatable chain should contain at least 12 links and preferably 18 links per aromatic group.

Since the effectiveness of the dispersant in a dispersion of any particular solid or liquid may vary with the nature of the aromatic group, the dispersant may also contain aromatic groups of different types so that it is of more general use in dispersions containing different solids or liquids.

The possibility of attaching more than one aromatic group to a solvatable chain of suitable length arises particularly in the case where the solvatable chain-like component is an addition co-polymer, one co-monomer of which provides a reactive group by means of which the aromatic groups may be attached to form the dispersant.

In random copolymers of this type, aromatic groups may be attached at several points along the length of the random polymer chain. In an alternative embodiment the copolymer may be a block or graft copolymer in which the reactive groups, by means of which the aromatic groups are attached, are confined to one segment of the copolymer, another segment of the copolymer providing the solvatable chain-like component.

According to this invention we also provide dispersions of a solid or liquid disperse phase in an organic continuous phase in which a dispersant of the above-described formula is present, the chain-like component of the dispersant being solvated by the organic continuous phase.

The invention is of particular value in improving dispersions of pigments, pesticides, blowing agents, metallic powders, solid polymer particles, such as polyvinyl chloride, polyvinyl acetate, polyvinylidene chloride, polyethylene, polypropylene and polyacrylonitrile and liquid particles of insoluble low molecular weight polymers. The particles may be dispersed in the organic continuous phase by a grinding, milling, emulsification, precipitation, or other technique. The dispersant may be added to the medium in which the particles are to be dispersed or the particles may be pretreated with the dispersant. The invention is of particular value in improving dispersion of pigments in coating compositions and in moulded and extruded plastics.

The proportion of dispersant to be used will depend on such factors as the disperse phase content and particle size of the dispersion, the size of the chain-like component of the dispersant, the nature of the aromatic group and the strength of any polar group attached thereto and the number of aromatic groups attached to the chain-like component, and may range from as low as 0.1% to 200% or higher by weight of the disperse phase.

The use of dispersants of this invention can lead to an increase in the volume of material which can be dispersed in the organic medium, or to an improvement in the flow properties of dispersions in organic liquids, or to an increase in the rate of dispersion of the material in the medium. In one particular type of dispersion, i.e. dispersions of pigments in paints, the use of the dispersants can lead to improved gloss, colour values or opacity.

When the dispersants are used in pigmented paints in which the chain-like component is solvated by the volatile organic liquid used to dissolve or disperse the film-forming component of the paint it is highly desirable that the solvatable chain of the dispersant should be compatible with the film-forming component in the dry film of paint left when the volatile organic liquid of the paint has evaporated. In solution-type paints it is preferable that the solvatable chain be of the same type as the main film-forming component; this latter is in solution in the volatile organic liquid of the paint and therefore the chain-like component of the dispersant, being of the same type, will be readily solvated by the organic liquid of the paint. For example, where the main film-forming polymer is an alkyd resin then the solvatable chain like component of the dispersant used to assist dispersion of pigment therein is preferably an alkyd resin to which has been attached the aromatic group and adjacent hydroxyl group. Similarly, where the main polymer is an acrylic polymer then the chain-like component of the dispersant is preferably also an acrylic polymer. Again, where the paint contains an epoxy resin then the chain-like component of the dispersant is preferably also an epoxy resin.

The three above mentioned types of chain-like components are particularly useful in dispersants for use in improving dispersion of pigments in paints. Alkyd resins for such use may be of conventional types, the main polyester-forming components usually being glycerol and phthalic anhydride though other polyhydric alcohols, such as ethylene glycol, trimethylol propane or pentaerythritol, and other polycarboxylic acids, such as meta- and tere-phthalic, maleic, itaconic or trimellitic acid, may be used to modify the properties of the resin. The alkyd may be modified with drying or non-drying oils (or fatty acids therefrom) such as linseed oil, soya bean oil, dehydrated castor oil, tung oil, tall oil, coconut oil or castor oil. Such alkyds containing free carboxyl groups are readily made into dispersant by reaction with a glycidyl ester of an aromatic acid.

Addition polymers such as acrylic resins are useful in that their polarity, and consequently their solvatability, can be controlled by choice of monomers.

Epoxy resins are also very useful as the chain-like component in dispersants for use in paints containing similar resins.

The invention is illustrated by the following examples in which all parts are by weight.

EXAMPLE 1

A methyl methacrylate/glycidyl methacrylate copolymer was prepared by polymerizing a mixture of:

|  | Parts |
|---|---|
| Methyl methacrylate monomer | 1091 |
| Glycidyl methacrylate monomer | 34 |
| Benzoyl peroxide paste (60% benzoyl peroxide) | 8.45 |
| Methyl isobutyl ketone | 193 |
| Toluene | 1118 | to produce a solution containing 45% of a copolymer of molecular weight about 80,000.

The solution was diluted with methyl isobutyl ketone until the solids content was 38.5%. Approximately 12% of the epoxy groups in the copolymer were then esterified with para-nitrobenzoic acid by refluxing a mixture of:

|  | Parts |
|---|---|
| Copolymer solution as described above | 2400 |
| Para-nitrobenzoic acid | 3.93 |
| Dimethyl tertiary amine | 2.4 | until the acid value fell below 0.2 (acid value is defined as the number of milligrammes of potassium hydroxide required to neutralize 1 gramme of solid resin).

This modified polymer has been found to be a very effective dispersing agent compared with a methyl methacrylate homopolymer or a more conventional methyl methacrylate/methacrylic acid copolymer.

For example, when a dispersion of the pigment Thio Fast Red was prepared by grinding it in a ball mill with a 70:30 mixture of toluene:methyl isobutyl ketone containing 20% of a 98:2 methyl methacrylate:methacrylic acid copolymer, the maximum proportion of pigment which could be satisfactorily dispersed was 4.9% by volume of the dispersion. When the organic liquid contained only 15% of the modified copolymer referred to above, i.e. the para-nitrobenzoate ester of 97:3 methyl methacrylate: glycidyl methacrylate, the Thio Fast Red pigment was satisfactorily dispersed at a pigment volume of 10% of the dispersion. Other advantages obtained using the modified copolymer as dispersant were (i) a considerable reduction in the time required to achieve a satisfactory degree of dispersion—after 32 hours in the ball mill the product containing the 98:2 methyl methacrylate:methacrylic acid dispersant had a fineness gauge reading between 5 and 10 microns; the product containing the modified copolymer, i.e. the 97:3 methyl methacrylate:glycidyl methacrylate esterified with para-nitrobenzoic acid had a fineness gauge reading of below 5 microns after 16 hours milling time; (ii) an improved yield of dispersion from the mill—whereas the product containing the standard dispersant was thixotropic, the product containing the modified copolymer dispersant had little or no structure and flowed more readily from the mill; (iii) a considerable improvement in reflow characteristics and gloss of paints based on the pigment dispersion containing the modified copolymer dispersant compared with that based on the pigment dispersion containing the standard dispersant.

Similar advantages over the normal 98:2 methyl methacrylate:methacrylic acid copolymer were obtained when the modified copolymer dispersant was used in organic liquids in which was dispersed one of a variety of pigments including titanium dioxide, yellow iron oxide, Monastral Blue Lake, Milori Blue, Monastral Green, Carbon Black Lake, Cinquasia Red, Cinquasia Violet, Molybdate Orange, Vegetable Black, Kromo Red, Neospectra Mark 2 Carbon Black. In the case of the last pigment a particularly good jetness of colour and blueness of tone were obtained.

EXAMPLE 2

A 97:3 methyl methacrylate:glycidyl methacrylate copolymer was prepared according to the method given in Example 1, but instead of esterifying with para-nitrobenzoic acid, the copolymer was then esterified with an equivalent proportion of a range of aromatic and heterocyclic acids according to the procedure detailed in Example 1. The acids included benzoic acid, ortho- and meta-nitrobenzoic acid, 3:5 dinitrobenzoic acid, para-chlorobenzoic acid, para-aminobenzoic acid, toluic acid, naphthoic acid, para-methoxybenzoic acid, quaterized para-aminobenzoic acid, nicotinic acid, picolinic acid, para-nitrocinnamic acid. All dispersants prepared in this way showed on a variety of pigments some or all of the advantages listed in Example 1 when compared with the standard 98:2 methyl methacrylate:methacrylic acid dispersant.

EXAMPLE 3

A dispersant was prepared from an epoxidized polybutadine resin of molecular weight about 3,000 by esterification with para-nitrobenzoic acid as follows:

| | Parts |
|---|---|
| Resin | 486 |
| Para-nitrobenzoic acid | 19.5 |
| Dimethyl tertiary amine | 0.5 |
| Xylol | 489 |

The mixture was heated with stirring to 140° C. and maintained at this temperature until the acid value had dropped to below 0.1.

It was possible to disperse 33% more Vegetable Black in the organic liquid containing the dispersant than in a corresponding solution of the unmodified epoxidized polybutadiene resin.

EXAMPLE 4

A dispersant was prepared from epoxidized soya bean oil by esterification with para-nitrobenzoic acid as follows:

| | Parts |
|---|---|
| Epoxidized oil | 250 |
| Para-nitrobenzoic acid | 33 |
| Aliphatic/aromatic hydrocarbon (boiling range 155–195° C.) | 90 |
| Dimethyl tertiary amine | 0.4 |

The mixture was heated with stirring to 140° C. and maintained at this temperature until the acid value of the solid resin had dropped to 0.32. The product was diluted with a mixture of 1:2 xylol/hydrocarbon (as above).

It was possible to disperse 50% more Vegetable Black in the organic liquid containing the modified epoxidized oil than in the organic liquid containing the corresponding unmodified epoxidized oil.

EXAMPLE 5

A conventional long oil-modified alkyd resin was prepared based on pentaerythritol phthalate modified with 68% of soya bean oil and having a final acid value of 9.6. This resin was reacted with glycidyl para-nitrobenzoate in the following manner:

| | Parts |
|---|---|
| Alkyd resin (75% solids in white spirit) | 1000 |
| Dimethyl tertiary amine | 1 |
| Glycidyl para-nitrobenzoate | 30.2 |

The mixture was heated with stirring to 130° C.–140° C. and held at this temperature until the acid value had fallen to below 1.5.

Pigment dispersions were prepared in ball mills using the alkyd resin modified with the glycidyl para-nitrobenzoate and the corresponding untreated alkyd resin. The following advantages were noted when using the modified alkyd dispersant:

Using Vegetable Black there was an improvement in the flow characteristics of the dispersion.

With Monastral Blue there was a 20% increase in the proportion of pigment which could be dispersed and also some improvement in flow characteristics.

Using Monolite Yellow 10GS the proportion of pigment which could be dispersed was increased by nearly 50% and despite this higher pigment content, general flow characteristics of the dispersion were improved.

EXAMPLE 6

Polymerized linseed oil of viscosity 30 poises and acid value 9.6 was reacted with glycidyl para-nitrobenzoate in the following manner:

| | Parts |
|---|---|
| Polymerized linseed oil | 500 |
| Xylol | 500 |
| Dimethyl tertiary amine | 0.5 |
| Glycidyl para-nitrobenzoate | 20 |

The mixture was heated with stirring to 140° C.–145° C. and held at this temperature until the acid had fallen below 4.

Pigments were dispersed in the xylol containing the linseed stand oil modified with the glycidyl para-nitrobenzoate and compared with pigment dispersions in xylol containing the corresponding unmodified lineseed stand oil. The following advantages were noted with the modified linseed stand oil dispersant.

Using Vegetable Black there was an increase of 50% in the proportion of pigment which could be dispersed.

With Monolite Yellow 10GS there was an increase of approximately 50% in the proportion of pigment which could be dispersed.

In neither case was there any deterioration in the general flow characteristics of dispersions containing these higher proportions of pigment.

EXAMPLE 7

A dispersing agent was prepared from glycidyl oleate esterified with para-nitrobenzoic acid.

| | Parts |
|---|---|
| Glycidyl oleate | 92 |
| Para-nitrobenzoic acid | 32.5 |
| Dimethyl tertiary amine | 0.1 |
| Toluene | 92 |

The mixture was heated with stirring to 120° C.–125° C. and maintained at this temperature until the acid value had fallen to below 0.2 mgm. KOH/gm. resin. Toluene was removed under vacuum and the product dissolved in aliphatic/aromatic hydrocarbon (boiling range 155° C.–195° C.).

Pigment dispersions in the hydrocarbon containing the glycidyl oleate modified with the para-nitrobenzoic acid were compared with pigment dispersions in the hydrocarbon containing corresponding unmodified glycidyl oleate. The following advantages were noted with the modified dispersant.

Using Vegetable Black there was an increase of more than 200% in the pigment content and some improvement in the general flow characteristics of the dispersion.

With Monolite Yellow 10GS the increase in the pigment content was of the order of 10% with a considerable improvement in the general flow characteristics.

EXAMPLE 8

A methacrylate-based polymer soluble in aliphatic/ aromatic hydrocarbon (boiling range 155° C.–195° C.) was made in the following manner:

| | Parts |
|---|---|
| Lauryl methacrylate monomer | 586 |
| Butyl methacrylate monomer | 127.5 |
| Glycidyl methacrylate monomer | 37.5 |
| Hydrocarbon (as above) | 610 |
| Aliphatic hydrocarbon (boiling range 70° C.–95° C.) | 1139 |
| Azodiisobutyronitrile | 7.5 |

The mixture was heated with stirring to 86° C.–88° C. and maintained at this temperature for 2 hours. At this stage a further 3.75 parts of azodiisobutyronitrile were added and heating continued for a further 2 hours; at this stage a further addition of 1.87 parts of azodiisobutyronitrile was made and heating continued for a further 2 hours maintaining a temperature of 86° C.–88° C. throughout the process.

757 parts of solvent were then removed by distillation and since much of this was the lower boiling solvent the reflux temperature rose to approximately 130° C. The solids content of the solution was 48.1%.

The polymer was then esterified in the following manner:

| | Parts |
|---|---|
| Polymer solution (48.1% solids) | 1374 |
| Para-nitrobenzoic acid | 6.36 |
| Dimethyl tertiary amine | 1.37 |

The mixture was heated with stirring to 130° C. and maintained at 130° C.–140° C. until the acid value had fallen below 0.2.

A pigment dispersion was prepared in a ball mill by grinding Vegetable Black in the organic liquid containing this dispersant and this was compared with a standard dispersion of Vegetable Black pigment in a solution of long oil-modified alkyd resin. Each dispersion was used to tint a white gloss paint based on a long oil-modified alkyd resin dissolved in the same aliphatic/aromatic hydrocarbon as used in the dispersant solution. At the same white/black ratio it was found that the colour strength of the black pigment dispersion based on the modified methacrylate dispersant was 24% stronger than the colour strength of the standard black pigment dispersion based on the oil-modified alkyd resin.

Using the same modified dispersant the colour strength of a dispersed pigment mixture comprising 60% Monolite Fast Scarlet RBS and 40% Monolite Fast Red GS was found to be 20% stronger than the corresponding dispersion of pigment mixture in a long oil alkyd medium when used to tint a white gloss paint based on a long oil alkyd resin dissolved in the same aliphatic/aromatic hydrocarbon as above.

EXAMPLE 9

A copolymer dispersant was prepared in the following manner:

Stage 1

| | Parts |
|---|---|
| Polyhydroxystearic acid (molecular weight about 1500) | 1100 |
| Aliphatic/aromatic hydrocarbon (boiling range 155° C.–195° C.) | 900 |
| Hydroquinone | 1 |
| Dimethyl tertiary amine | 2 |
| Glycidyl methacrylate | 150 |

The mixture was heated with stirring to reflux and maintained at this temperature (about 140° C.) until the acid value of the polymer fell below 1.0. The final solids content of the polymer solution was 50.1%.

Stage 2

A vessel was charged with 610 parts of hydrocarbon (as above) and over a period of 5 hours the following mixture was drip fed into the vessel:

| | Parts |
|---|---|
| Vinyl toluene | 163 |
| Styrene | 163 |
| Polymer solution as prepared in Stage 1 | 300 |
| Glycidyl methacrylate | 18 |
| Azodiisobutyronitrile | 10 |

Throughout this period the temperature was maintained at 85° C.–90° C. Further additions of azodiisobutyronitrile were made after 5, 7, 9 and 11 hours heating the amount being 2 parts on each occasion.

Heating was continued for a total of approximately 12 hours at which stage the solids content was 38.5%.

Stage 3

The copolymer prepared as described in Stage 2 was esterified with para-nitrobenzoic acid in the following manner:

| | Parts |
|---|---|
| Copolymer solution as described in Stage 2 | 500 |
| Para-nitrobenzoic acid | 7.05 |
| Dimethyl tertiary amine | 0.5 |

The mixture was heated with stirring to 140° C. and maintained at this temperature until the acid value had fallen below 0.2.

The product was a solution in organic liquid of a graft copolymer in which solvatable polyhydroxystearic chains and aromatic groups were attached to a vinyl toluene/styrene/methacrylate polymer chain.

Approximately 15% more Vegetable Black could be dispersed in this organic liquid containing the dispersant than in a corresponding organic liquid containing the copolymer free of esterified para-nitrobenzoic acid. Further, the dispersion in the esterified copolymer solution had greatly improved flow characteristics. A similar improvement in flow properties was noted in pigment dispersions in organic liquid containing in solution the para-nitrobenzoic acid esterified copolymer dispersant and Monolite Yellow 10GS as compared with the dispersions of Monolite Yellow 10GS in solutions of the copolymer containing no esterified para-nitrobenzoic acid.

EXAMPLE 10

A lauryl methacrylate/butyl methacrylate/glycidyl methacrylate copolymer was prepared in the following manner:

| | Parts |
|---|---|
| Lauryl methacrylate | 51 |
| Butyl methacrylate | 234 |
| Glycidyl methacrylate | 15 |
| Aliphatic hydrocarbon (boiling range 70° C.–95° C.) | 455 |
| Aliphatic/aromatic hydrocarbon (boiling range 155° C.–195° C.) | 245 |
| Azodiisobutyronitrile | 5.4 |

The mixture was heated to reflux with stirring and maintained at this temperature for 2 hours. At this stage a further addition was made:

Azodiisobutyronitrile—2.7 parts

Reflux was continued for a further 2 hours at which stage most of the low boiling solvent was removed by distillation to give a solution containing 45.8% solids. 90% of the epoxy groups in the copolymer were then esterified with 3:5 dinitrobenzoic acid in the following manner:

| | Parts |
|---|---|
| Copolymer solution as described above | 1000 |
| 3:5 dinitrobenzoic acid | 30.2 |
| Dimethyl tertiary amine | 1 |

The product was heated under reflux with stirring over a period of 21 hours during which time the temperature rose slowly from 126° C. to 140° C. and the acid value dropped to 0.275.

The esterified copolymer was found to be a very effective dispersing agent compared with the lauryl methacrylate/butyl methacrylate/glycidyl methacrylate copolymer not esterified with the 3:5 dinitrobenzoic acid.

Approximately 50% more Monolite Yellow 10GS could be dispersed in the organic liquid containing in solution the aromatic acid modified copolymer than in a corresponding solution of unmodified copolymer.

EXAMPLE 11

A dispersant was prepared from linseed oil monoglycerides and para-nitrobenzoyl chloride in the following manner:

|  | Parts |
|---|---|
| Linseed oil monoglycerides | 540 |
| Para-nitrobenzoyl chloride | 278 |
| Lutidine | 160 |

The mixture was heated with stirring to 90° C. and maintained at this temperature for 9 hours. The product was dissolved in aliphatic/aromatic hydrocarbon (boiling range 155° C.–195° C.) and a small amount of insoluble product removed by filtration. The filtrate was washed with dilute hydrochloric acid until free from lutidine, followed by two washings with distilled water. The solution was then dried over anhydrous magnesium sulphate.

Approximately 75% more Monolite Yellow 10GS could be dispersed in the liquid hydrocarbon containing the modified monoglyceride than in a corresponding solution of unmodified monoglyceride.

EXAMPLE 12

An improved dispersant was prepared from an epoxy resin as follows:

|  | Parts |
|---|---|
| Xylol | 200 |
| Dimethyl tertiary amine | 0.6 |
| Para-nitrobenzoic acid | 167 |
| Liquid epoxy resin (molecular weight about 400, epoxide content 1 gm. equivalent per 200 gms. of resin) | 400 |

The mixture was heated to 150° C. and held at this temperature until the acid value had fallen to below 1.

Titanium dioxide was dispersed in the solution of esterified epoxy resin, the pigment dispersion then being mixed with a further quantity of the unmodified epoxy resin and an epoxy-reactive polyamide resin. It was found that the paint gave films of higher gloss than a corresponding paint in which the pigment was dispersed in a solution of un-esterified epoxy resin.

The epoxy resin used in this example was a condensation product of epichlorhydrin and diphenylol propane. Similar results were obtained with higher molecular weight products of such a condensation reaction, e.g. products of molecular weight up to 4000.

In the above example, only one epoxy group of the resin is esterified, but with approximately higher molecular weight resins both terminal epoxy groups may be esterified.

Alternatively, if one terminal epoxy group of the resin is esterified with a long chain fatty acid, an improved dispersant is obtained if the other terminal epoxy group is esterified with an aromatic acid to provide the basic structure given in the formula above. The fatty acid provides a further extension of the solvatable chain-like component of the dispersant.

EXAMPLE 13

A dispersion was made based on the following ingredients:

|  | Parts |
|---|---|
| Monolite Yellow 10GS | 75.8 |
| Polymer solution [1] | 98.5 |
| White spirit | 29.5 |

[1] A solution comprising 39 parts of polymer in 61 parts of white spirit, the polymer being a random copolymer of composition 80/17/3 lauryl methacrylate/butyl methacrylate/glycidyl methacrylate, in which the epoxy group is reacted with para-nitrobenzoic acid.

The mixture, which contains approximately 25% by volume of Monolite Yellow, disperses readily in a sand mill to give a free-flowing dispersion.

A similar dispersion, but in which the polymer is replaced by a pentaerythritol phthalate resin modified with 69% by weight of linseed oil, could not readily be made by this process at this pigment volume. Such dispersions as could be made are highly thixotropic and a normal pigment volume which would enable the dispersion to be handled easily would be around 12%–14%.

EXAMPLE 14

Similar results were obtained to those of Example 13 using:

|  | Parts |
|---|---|
| Vegetable Black | 61.0 |
| Polymer solution (as in Example 13) | 69.5 |
| White spirit | 66.5 |

This dispersion contains approximately 17% by volume of Vegetable Black, whereas to obtain a useful dispersion in the alkyd resin described in Example 13, Vegetable Black content had to be reduced to 5% by volume.

The dispersions described in the above examples illustrate uses and advantages of a selection of the dispersants of this invention which may, of course, be used in dispersions of many materials other than the pigments used by way of illustration.

Pigment dispersions as exemplified above are of particular value in paint compositions and as has been explained, they are used to the best advantage when the dispersant is compatible with the film-forming material in the dry paint film as indicated in the following table:

| Example | Chain-like component of dispersant | Suitable type of paint |
|---|---|---|
| 1 and 2 | Acrylic polymer | Acrylic lacquers. |
| 3 | Polybutadiene | Polybutadiene stoving paint. |
| 4 | Epoxidized oil | Air-drying alkyd paint. |
| 5 | Alkyd resin | Alkyd, air-drying or stoving. |
| 6 | Polymerized oil | Oil paint or air-drying alkyd paint. |
| 7 | Fatty acid | Air-drying alkyd paint. |
| 8 | Hydrocarbon-soluble acrylic polymer. | Alkyd paint or P.V.C. dispersion paint. |
| 9 | Poly(OH-stearic acid) | Alkyd paint or acrylic dispersion paint. |
| 10 | Hydrocarbon-soluble acrylic polymer. | Alkyd paint or P.V.C. or acrylic dispersion paint. |
| 11 | Fatty acid mono-glyceride | Nitrocellulose lacquer. |
| 12 | Epoxy resin | Epoxy stoving paint. |
| 13 and 14 | Acrylic polymer | Air-drying alkyd paint. |

We claim:

1. A paint composition comprising an organic liquid containing dissolved or dispersed therein a film-forming material, a pigment which is insoluble in said organic liquid and dispersed therein, and 0.1 to 200% by weight of the pigment of a dispersant for said pigment, said dispersant being soluble in said organic liquid and having the formula:

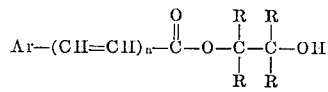

in which Ar is an aromatic group, $n$ is 1 or 0, from 2 to 3

R groups are H, CH₃ or C₂H₅ and the remaining R group or groups individually or the remaining group

R—C—C—R in combination provides a chain-like component of at least 12 atoms linked in series which is solvated by said organic liquid.

2. A paint composition as claimed in claim 1 in which the solvated chain-like component is of at least 18 atoms linked in series.

3. A paint composition as claimed in claim 1 in which the chain-like component is an alkyd resin which is solvated by said organic liquid.

4. A paint composition as claimed in claim 1 in which the chain-like component is an addition polymer which is solvated by said organic liquid.

5. A paint composition as claimed in claim 1 in which the chain-like component is an acrylic polymer which is solvated by said organic liquid.

6. A paint composition as claimed in claim 1 in which the chain-like component is an epoxy resin which is solvated by said organic liquid.

7. A paint composition as claimed in claim 1 in which the aromatic group is phenyl or substituted phenyl.

8. A paint composition as claimed in claim 7 in which the aromatic group is para-nitrophenyl.

References Cited

UNITED STATES PATENTS

| | | |
|---|---|---|
| 2,768,153 | 10/1956 | Shokal. |
| 2,939,853 | 6/1960 | Delius. |
| 2,947,726 | 8/1960 | Belanger. |
| 2,580,901 | 1/1952 | Erickson et al. _____ 260—80.5 |
| 2,944,974 | 7/1960 | Lorensen et al. _____ 260—80.5 |
| 2,988,524 | 6/1961 | Fitch _____ 260—80.5 |
| 3,052,659 | 9/1962 | Woodruff _____ 260—80.5 |

FOREIGN PATENTS 241,511   11/1962   Australia.

DONALD E. CZAJA, *Primary Examiner.*

R. W. GRIFFIN, *Assistant Examiner.*

U.S. Cl. X.R.

260—18, 23, 23.7, 31.2, 32.8, 33.6, 40, 41, 41.5; 106—308; 252—351